(12) United States Patent  (10) Patent No.: US 9,195,569 B2
Rabin  (45) Date of Patent: Nov. 24, 2015

(54) SYSTEM AND METHOD TO IDENTIFY CODE EXECUTION RHYTHMS

(71) Applicant: Nintendo Co., Ltd., Kyoto (JP)

(72) Inventor: Steve Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/165,818

(22) Filed: Jan. 28, 2014

(65) Prior Publication Data

US 2014/0215442 A1  Jul. 31, 2014

Related U.S. Application Data

(60) Provisional application No. 61/757,446, filed on Jan. 28, 2013.

(51) Int. Cl.
*G06F 9/44* (2006.01)
*G06F 11/36* (2006.01)
*G06F 11/34* (2006.01)

(52) U.S. Cl.
CPC ........ *G06F 11/3664* (2013.01); *G06F 11/3419* (2013.01); *G06F 11/3466* (2013.01); *G06F 2201/81* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,212,794 A * | 5/1993 | Pettis et al. | ................... | 717/153 |
| 6,597,373 B1 * | 7/2003 | Singla et al. | ................... | 345/698 |
| 6,792,469 B1 * | 9/2004 | Callahan et al. | .............. | 709/231 |
| 2004/0057400 A1 * | 3/2004 | Walsh et al. | .................. | 370/329 |
| 2004/0111708 A1 * | 6/2004 | Calder et al. | .................. | 717/131 |
| 2006/0020923 A1 * | 1/2006 | Lo et al. | ......................... | 717/127 |
| 2006/0242636 A1 * | 10/2006 | Chilimbi et al. | ............. | 717/158 |
| 2007/0071413 A1 * | 3/2007 | Takahashi et al. | .............. | 386/96 |
| 2008/0170073 A1 * | 7/2008 | Ono et al. | .................. | 345/440.1 |
| 2008/0300845 A1 * | 12/2008 | Kostick et al. | .................. | 703/13 |
| 2009/0110366 A1 * | 4/2009 | Ogikubo et al. | ................ | 386/52 |
| 2009/0147006 A1 * | 6/2009 | Buck et al. | ................. | 345/440.2 |
| 2012/0046769 A1 * | 2/2012 | Ejiri | .............................. | 700/94 |
| 2012/0203740 A1 * | 8/2012 | Ben-Dyke et al. | ........... | 707/639 |
| 2013/0067445 A1 * | 3/2013 | Gounares et al. | ............. | 717/152 |
| 2013/0326416 A1 * | 12/2013 | Rabin | .......................... | 715/835 |

* cited by examiner

*Primary Examiner* — Chameli Das
(74) *Attorney, Agent, or Firm* — Nixon & Vanderhye, P.C.

(57) ABSTRACT

The present technology is directed to accurately identifying code execution rhythms from a running program, even when they are occasionally irregular. The present technology is capable of detecting and inferring the rhythms without any prior knowledge or expectations of rates or number of rhythms present in a running program. These code execution rhythms can then be used to further understand and analyze the behavior of a running program, for example, by exposing various rhythms that might have been unknown/unrealized, irregularity of rhythms, or by analyzing the behavior of functions on a per frame basis under different rhythms.

16 Claims, 12 Drawing Sheets

| Entry | Function A (start, end) | Function B (start, end) | Function C (start, end) |
|---|---|---|---|
| 0 | (3, 5) | (7, 9) | (0, 3) |
| 1 | (6, 9) | (11, 12) | (20, 22) |
| 2 | (10, 12) | (37, 40) | (23, 24) |
| 3 | (18, 19) | (82, 84) | (40, 41) |
| 4 | (32, 36) | (84, 85) | (44, 45) |
| 5 | (37, 40) | (104, 107) | (60, 62) |
| 6 | (41, 44) | (135, 137) | (80, 81) |
| 7 | (46, 52) | (162, 164) | (99, 100) |
| 8 | (66, 67) | | (102, 103) |
| 9 | (68, 75) | | (120, 122) |
| 10 | (76, 80) | | (140, 141) |
| 11 | (81, 84) | | (160, 162) |
| 12 | (85, 86) | | |
| 13 | (96, 99) | | |
| 14 | (103, 108) | | |
| 15 | (128, 131) | | |
| 16 | (131, 140) | | |
| 17 | (141, 143) | | |
| 18 | (144, 145) | | |
| 19 | (158, 160) | | |
| 20 | (162, 166) | | |
| 21 | (167, 170) | | |

FIGURE 2B

| RANK | FUNCTION | SCORE | ESTIMATED PERIOD | MELD TIME |
|---|---|---|---|---|
| 1 | C | 2.5% | 20ms | 4ms |
| 2 | A | 16.4% | 30ms | 8ms |
| 3 | B | 25.8% | 30ms | 2ms |

FIGURE 6

| GROUP | FUNCTIONS | GROUP PERIOD |
|---|---|---|
| 1 | C | 20ms |
| 2 | A,B | 30ms |

FIGURE 7

SYSTEM AND METHOD TO IDENTIFY CODE EXECUTION RHYTHMS

CROSS-REFERENCES TO RELATED APPLICATIONS

This application claims priority to U.S. Application No. 61/757,446, filed Jan. 28, 2013, the entire contents of which are incorporated herein by reference.

BACKGROUND

We are surrounded by rhythms. The songs we dance to and sing along with contain rhythms. The sun rising and setting, and tides rising and falling by phases of the moon, are kinds of rhythms. The cyclical sound of a car engine is another type of rhythm. So is the "rat-tat-tat" of a jackhammer or the characteristic sound of a drilling rig.

Executing software can also exhibit silent but discernible rhythms. It would be useful to put these rhythms to use.

BRIEF DESCRIPTION OF THE DRAWINGS

The detailed description is set forth with reference to the accompanying figures:

FIG. 2B is a diagram showing a non-limiting example implementation of the sampled functions transformed into a list of runs;

FIG. 6 is a diagram showing a non-limiting example implementation of a list of executed functions ordered by score;

FIG. 7 is a diagram showing a non-limiting example implementation of a group of functions that are grouped together based on a period and a score;

DETAILED DESCRIPTION OF EXAMPLE NON-LIMITING EMBODIMENTS OF THE TECHNOLOGY

Figure 1:
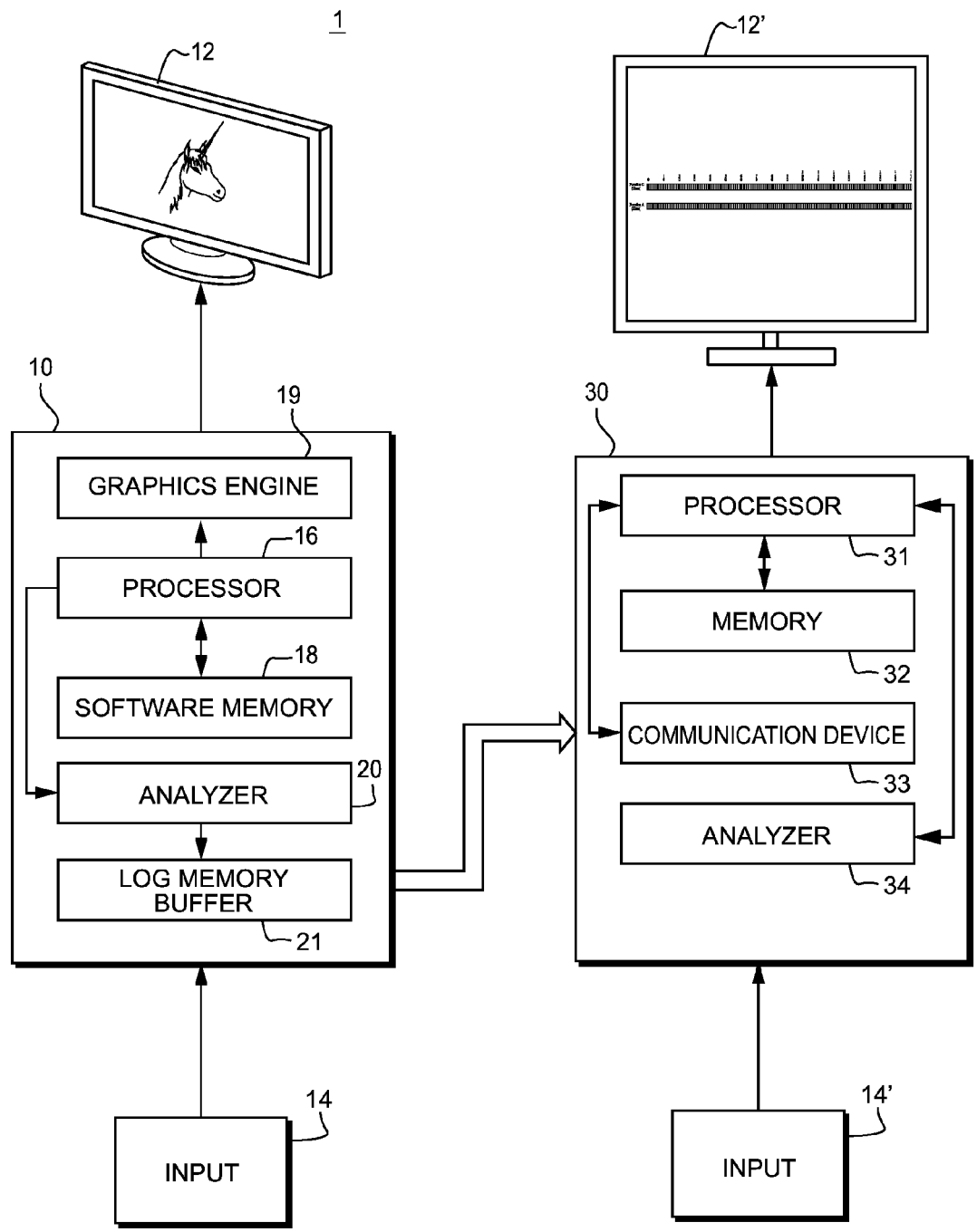
FIG. 1 is a block diagram showing an illustrative non-limiting implementation of a software analysis system.

Software profilers aid in analyzing the dynamic behavior of a computer program (e.g., for optimizing the program's performance or finding bugs or other problems). Commonly-assigned U.S. application Ser. Nos. 12/533,845 and 12/534,048 (also incorporated herein by reference) describe example profilers. This disclosure describes a way to improve upon current software profiler systems in order to detect code execution rhythms in a software program.

One of our insights is that out of thousands of executing functions in a running program, over a period of seconds, there likely exists a handful of functions that are indicative and exemplars of the code execution rhythms in the program as a whole. However, it is typically not obvious (even to the programmer who developed the code) which functions these might be.

Accurately detected and inferred code execution rhythms from a running program can be used by themselves or in conjunction with a code profiler to analyze the execution of a program. The detected rhythms could, for example, indicate which parts of the software execution may be problematic, indicate when certain functions are executed irregularly, or even which parts are operating as expected. Just as a doctor can learn important things by listening to the rhythms of a patient's heartbeat, or a mechanic can learn important things by listening to the rhythms of an engine's sound, the detected rhythms of software may be able to provide insight as to the nature of the program's execution in a way that even those that created the program may not have known.

In many computer programs, such as video game and simulation programs, for example, the code ideally executes various functions on a regular periodic basis. This can be primarily due to the requirement to output a changing image on a display device (at a periodic display refresh rate) or to generate an audio output in response to human input and internal simulations of the program, for example. These types of software programs have many different rhythms that occur at differing periodic intervals, such as a 60 Hz draw rate, a periodic 3 ms audio processing rate, or a 100 ms simulation rate, often or sometimes all on a single CPU core (or multiple cores). Unfortunately, these rhythms are not always absolutely periodic and may shorten or elongate irregularly for periods of time, due to processing load, which makes them interesting to analyze and hard to detect.

The present non-limiting technology is directed to accurately detecting and inferring these and other code execution rhythms from a running program, even when they are occasionally irregular. The present non-limiting technology is capable of detecting and inferring such rhythms without any prior knowledge or expectations of rates or number of rhythms present in a running program. These code execution rhythms can then be used to further understand and analyze the behavior of a running program, for example, by exposing various rhythms that might have been unknown/unrealized, irregularity of rhythms, or by analyzing the behavior of functions on a per frame basis under different rhythms.

A handful of functions that are indicative as exemplars of code execution rhythms in the program can be identified by examining all functions and transforming their sampled execution times into a score based on periodic behavior of each function execution, such that the lowest scoring functions are likely candidates as exemplars of code execution rhythms. In one non-limiting example embodiment, the smaller list of candidate functions (e.g., those with the lowest scores) can then be further analyzed for periodic clusters (e.g., groups of functions that have a period similar to each other) and the lowest scoring function in each cluster is chosen as the basis for an identifiable rhythm. Additionally, clusters that contain the most candidates can be indicative of the code execution rhythms that are the most interesting and prevalent, thus allowing a ranking of the most important to least important code execution rhythms. The exact final rhythm times, over the duration of the sampled program execution, are then extracted from an abstracted transformation of these function's sampled execution times.

A non-limiting example involves analyzing executing software for periodic behavior by identifying those functions whose sample start and end times most strongly indicate code execution rhythms. These functions are clustered into groups of functions having similar periodicities, and the "best" (or most representative) function in each cluster is chosen as the basis for an identifiable rhythm. Abstracted transformations of sampled execution times of these selected functions can be extracted for further analysis and/or visualization.

Example Software Profiling System

FIG. 1 is a block diagram showing an illustrative non-limiting implementation of a video game software profiling system 1, which can include, for example, an embedded computing device. Although example software profiling system 1 is specifically used for analyzing video game software, in other embodiments it could profile any type of software. System 1 runs functions while also providing analysis. The system 1 includes a computing system 10 connected to a display 12 (or display device 12) and an input device 14. The computing system 10 includes a processor 16, which can execute a video game or other program. The game or other program can be stored in a non-transitory game software memory 18. System 1 further includes a graphics engine 19 that generates graphics for display on the display 12. The system 1 is not limited to a single processor or memory, but can comprise multi-core architecture, multiple processors and/or multiple memories, and/or remotely accessed network (e.g., cloud) computing components. Input from input device 14 can affect/control program execution.

The graphics engine 19 includes a frame buffer memory that composes images periodically at a frame rate (e.g., every $1/30^{th}$ or $1/60^{th}$ of a second) and reads out the images for display on the display 12. Frame refresh rate may be controlled by a timer that interrupts the processor 16 periodically or non-periodically. Display 12 may output audio/video data from the program being executed on system 10.

The computing system 10 can further include an analyzer 20 used in gathering the program execution data when the processor 16 executes a software program. The analyzer 20 can be implemented in any combination of software, hardware, and firmware. In one non-limiting illustrative embodiment, the analyzer 20 is a form of a software profiler that monitors a sequence of operations performed by the processor 16 while the processor executes the software program. The analyzer 20 collects data, which may specify various functions that are called during the execution of the software program, and their addresses, which in turn indicate where in the memory program the instructions are stored, as well as counts of times particular functions are called. The analyzer 20 can store the collected data in a non-transitory log memory buffer 21.

The system 1 also includes a software analysis device 30 (or information processing apparatus 30) capable of communicating with the computing system 10 via a communications device 33, for example. The data that is stored in the log memory buffer 21 can be conveyed to the software analysis device 30. The software analysis device 30 is also configured to have a processor 31 for analyzing the execution of a software program and a non-transitory memory 32 capable of storing a program for analyzing the execution of a software program. Likewise, the device 30 can be in communication with an input 14' and a display 12'.

The analysis device 30 is also configured with an analyzer 34 that can analyze the dynamic program behavior of a software program based on the analysis data provided from the computing system 10. Any of the components shown in system 30 could be incorporated in system 10 and/or on a remote system connected via a network (e.g., in the cloud or datacenter).

Display 12' can display a visualization of the analysis being performed by device 30. For example, a user can play a video game using system 10 where the game is displayed on display 12 while device 30 analyzes the gameplay and displays a visualization of a timeline display on display 12'. The technology is not limited to separately displaying these items and the same information can be conveyed on a single display or across a multitude of displays.

As explained above, the technology described herein is directed to accurately detecting and inferring code execution rhythms from a running program. One or more functions can be analyzed over various periods of time to determine a particular execution rhythm. This data can be visually conveyed to a user so that the user can, for example, modify functions as necessary to improve the program or determine which functions may be more ideal than others.

Figure 2A:
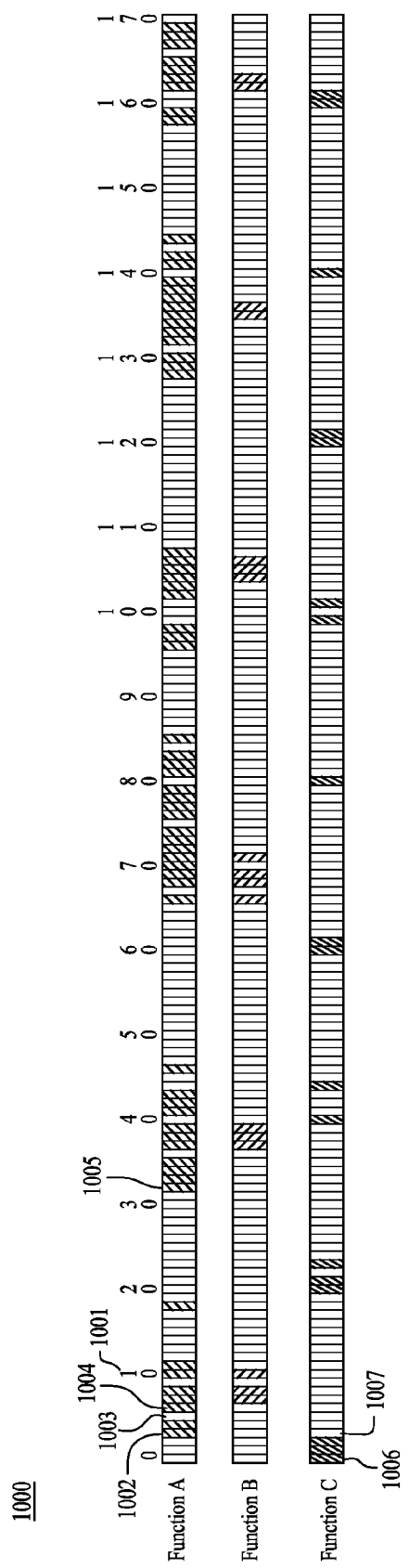
FIG. 2A is a diagram showing a non-limiting example implementation of sampled functions from a running program.

FIG. 2A shows a non-limiting example implementation of sampled functions 1000 from a running program. While a running program may normally have hundreds to thousands of functions executing, FIG. 2A shows three example functions that are sampled from a running program. Functions A-C are called/executed at various points in time as shown along the time axis of, for example, 170 milliseconds (ms).

The graph in FIG. 2A shows a 170 ms window of time with periods 1001 every 10 ms. In this example, Function A is called at time period 1002, which is at t=3 ms, and runs for a 2 ms period before it ceases being called at time period 1003, shown at t=5 ms. Function A begins running again at time period 1004, shown at t=6 ms in this example. Function A is called several times during the 170 ms window of time and can be seen called/executed again at time period 1005, which is t=32 ms in this example. Likewise, Function C is shown as starting execution at time period 1006 and ending execution at time period 1007, which are t=0 ms and t=3 ms respectively. FIG. 2B thus shows the sample Functions A-C transformed into a list of runs where the start and stop times each function is called/executed is indicated. For example, entry 0 shows the start/stop times of Functions A-C as shown in FIG. 2A. The list of runs are used in determining a rhythm of certain functions even if it is not obvious from viewing their execution alone.

Figure 3:
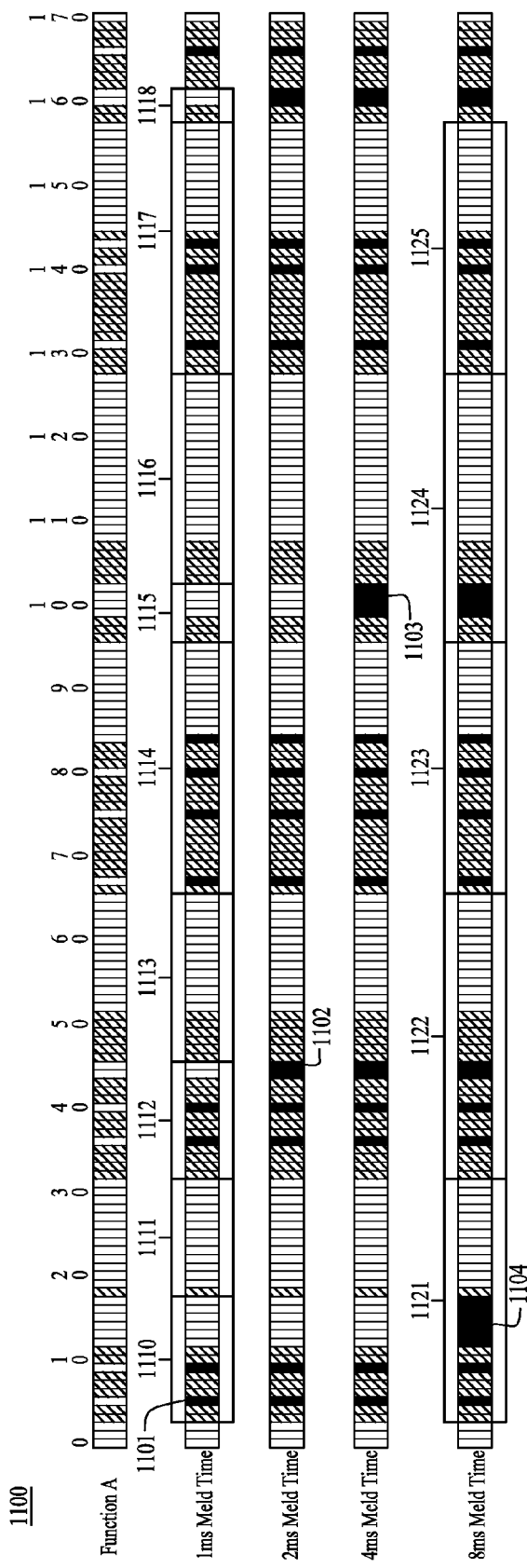
FIG. 3 is a diagram showing a non-limiting example implementation of the execution of a function with an analysis including different incremental periods of time.
Figure 4:
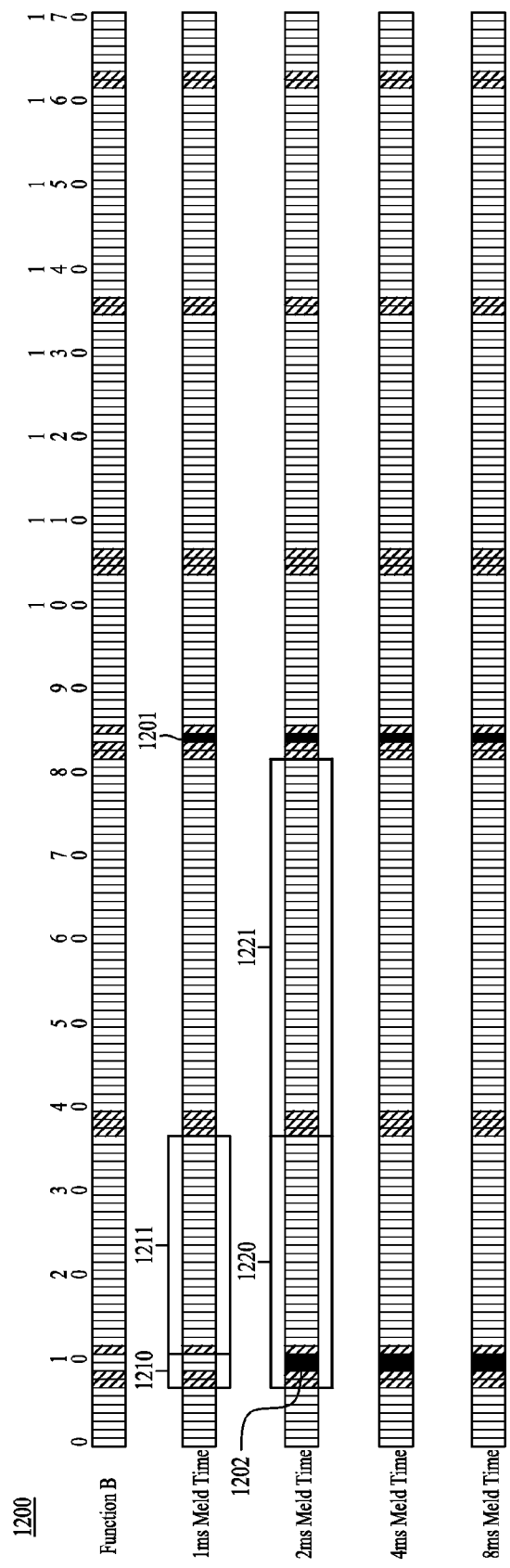
FIG. 4 is a diagram showing another non-limiting example implementation of the execution of a function with an analysis including different incremental periods of time.
Figure 5:
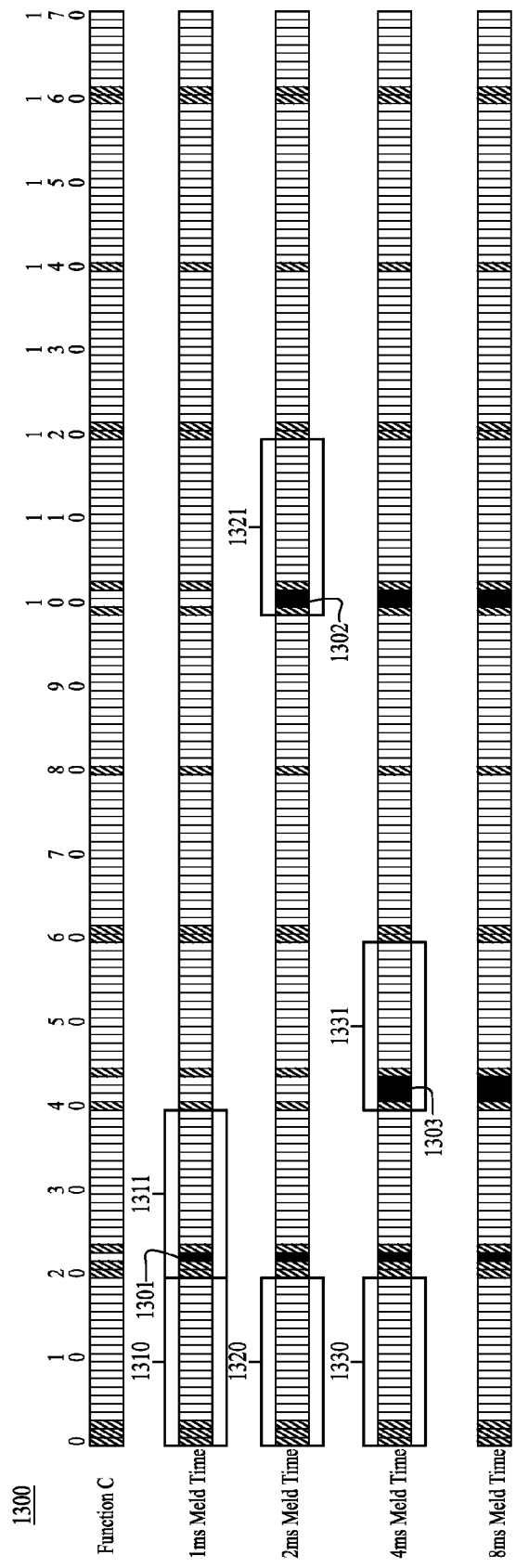
FIG. 5 is a diagram showing another non-limiting example implementation of the execution of a function with an analysis including different incremental periods of time.

FIGS. 3-5 thus show the first stage of analysis for determining a rhythm of execution for Functions A-C. FIG. 3 shows analysis 1100 being performed for Function A where the function is analyzed over different test time interval thresholds. In the examples shown in FIGS. 3-5, the functions are analyzed over four different "meld time" thresholds of 1 ms (time period 1101 in this example), 2 ms (time period 1102), 4 ms (time period 1103), and 8 ms (time period 1104), respectively. This "meld" time analysis could be looked at as a type of relaxation in order to automatically relax the criteria to recognize periodicity and thus periodic recognition of periodic patterns that might otherwise be concealed (or at least non-immediately evident) at higher time resolution sampling rates. In particular, the "meld" time analysis treats, as execution periods, non-execution periods neighboring execution periods in order to permit less literal repetitions to be recognized as substantially periodic. Successive relaxation of strict periodicity testing criteria meanwhile allows the process to discriminate accurately between more and less periodic execution rhythms.

A "meld time" threshold thus helps determine the periodicity of a function by clustering function execution based on the gap of time in execution. For example, the "meld" time period 1101 is shown when the gap in execution is 1 ms or less. Thus, any gap in execution of 2 ms or more will not satisfy the 1 ms "meld" time threshold but may satisfy longer "meld" time thresholds.

The "meld" time threshold helps analyze different periods of execution for a cluster of functions. As a non-limiting example, periods 1110, 1111, 1112, 1113, 1114, 1115, 1116, 1117, and 1118 represent different measured time periods for Function A during a 1 ms "meld" time analysis. For example, period 1110 represents when Function A is first called (i.e., at t=3 ms) and extends to the moment of time just before the time Function A is called again after Function A's does not satisfy the 1 ms "meld" time threshold. For example, Function A has a gap in execution at times 5 ms and 9 ms. As the gap in execution at 5 ms and 9 ms is only 1 ms, Function A continues to satisfy the 1 ms "meld" time threshold. Function A continues to satisfy the 1 ms "meld" time threshold up until 13 ms where Function A's gap in execution has a duration of 2 ms or greater. In this case, Function A's gap in execution extends for 6 ms and Function A does not get called again until t=18 ms. Thus, the first time period 1110 starts at t=3 ms and ends at t=17 ms inclusively (i.e., the time just before Function A is called again after Function A does not satisfy the "meld" time threshold 1 ms) leaving an execution period of 15 ms. Time periods 1111-1118 thus have execution periods of 14 ms, 14 ms, 20 ms, 30 ms, 6 ms, 26 ms, 30 ms, and 4 ms, respectively. As such, a 1 ms "meld" time in this example produces nine clusters of execution for Function A.

Function A is thus analyzed over four different "meld" time intervals where the different intervals can result in different clustering of the function execution. For example, the 8 ms "meld" time interval 1104 produces time periods 1121, 1122, 1123, 1124, and 1125 of durations 29 ms, 34 ms, 20 ms, 32 ms, and 30 ms, respectively. Likewise, the 2 ms and 4 ms "meld" time intervals 1102 and 1103 produce seven and six periods, respectively, of durations 15 ms, 14 ms, 34 ms, 20 ms, 6 ms, 26 ms, and 30 ms; and 15 ms, 14 ms, 34 ms, 20 ms, 32 ms, and 30 ms, respectively.

Upon determining the different periods for each "meld" time interval, the system then estimates the period of identified clusters for each particular "meld" time. Although not limited to any particular implementation, the non-limiting examples shown in FIGS. 3-5 estimate the periods based on the median period of duration (mean or other statistical values could be used instead). So the estimated periods in this example for the 1 ms, 2 ms, 4 ms, and 8 ms "meld" times are 15 ms, 20 ms, 20 ms, and 30 ms, respectively. The system then calculates the individual error differences from the median period for each "meld" time in order to evaluate periodicity. In this example, the individual error differences are the absolute value of time difference of each period from the median thus resulting in differences of 0 ms (t=15 ms−t=15 ms), 1 ms (t=15 ms−t=14 ms), 1 (t=15 ms−t=14 ms), 5 (t=20 ms−t=15 ms), 15 (t=30 ms−t=15 ms), 9 (t=15 ms−t=6 ms), 11 (t=26 ms−t=15 ms), 15 (t=30 ms−t=15 ms), 11 (t=15 ms−t=4 ms) for the 1 ms "meld" time. The "errors" are then divided by the median period and the total error value (which is the sum of the divided errors squared) is calculated to produce a sum of squares error or distance value $(0/15)^2+(1/15)^2+(1/15)^2+(5/15)^2+(15/15)^2+(9/15)^2+(11/15)^2+(15/15)^2+(11/15)^2=3.56$ in the case of the 1 ms "meld" time. The total "error" value is then divided by the period count and the square root of that value Sqrt(3.56/9) is taken to produce the score 0.629 (or 62.9%). A lower score indicates higher periodicity in this example. The lowest (i.e., highest resolution) "meld" time interval producing the lowest score error is selected as the exemplar "meld" time for clustering the functions into a group of periodic execution. The calculations for different example "meld" time intervals for Function A are provided in detail below:

1 ms Meld Time Calculations
  A. Periods=15, 14, 14, 20, 30, 6, 26, 30, 4
  B. Estimated Period (median)=15 ms
  C. Individual Error Diffs from Median Period=0, 1, 1, 5, 15, 9, 11, 15, 11
  D. Errors divided by Median Period=0/15, 1/15, 1/15, 5/15, 15/15, 9/15, 11/15, 15/15, 11/15
  E. Total Error Value (sum of squared)=$(0/15)^2+(1/15)^2+(1/15)^2+(5/15)^2+(15/15)^2+(9/15)^2+(11/15)^2+(15/15)^2+(11/15)^2=3.56$
  F. Divide by Count and Take Square Root=Sqrt(3.56/9)=0.629
  G. Score=62.9%

2 ms Meld Time Calculations
  A. Periods=15, 14, 34, 20, 6, 26, 30
  B. Estimated Period (median)=20 ms
  C. Individual Error Diffs from Median Period=5, 6, 14, 0, 14, 6, 10
  D. Errors divided by Median Period=5/20, 6/20, 14/20, 0/20, 14/20, 6/20, 10/20
  E. Total Error Value (sum of squared)=$(5/20)^2+(6/20)^2+(14/20)^2+(0)^2+(14/20)^2+(6/20)^2+(10/20)^2=1.47$
  F. Divide by Count and Take Square Root=Sqrt(1.47/7)=0.458
  G. Score=45.8%

4 ms Meld Time Calculations
  A. Periods=15, 14, 34, 20, 32, 30
  B. Estimated Period (median)=20 ms
  C. Individual Error Diffs from Median=5, 6, 14, 0, 12, 10
  D. Errors divided by Median=5/20, 6/20, 14/20, 0/20, 12/20, 10/20
  E. Total Error Value (sum of squared)=$(5/20)^2+(6/20)^2+(14/20)^2+(0/20)^2+(12/20)^2+(10/20)^2=1.25$
  F. Divide by Count and Take Square Root=Sqrt(1.25/6)=0.457
  G. Score=45.7%

8 ms Meld Time Calculations
  A. Periods=29, 34, 20, 32, 30
  B. Estimated Period (median)=30 ms
  C. Individual Error Diffs from Median=1, 4, 10, 2, 0
  D. Errors divided by Median=1/30, 4/30, 10/30, 2/30, 0/30
  E. Total Error Value (sum of squared)=$(1/30)^2+(4/30)^2+(10/30)^2+(2/30)^2+(0/30)^2=0.134$
  F. Divide by Count and Take Square Root=Sqrt(0.134/5)=0.164
  G. Score=16.4%

Thus, and as can be seen from above, the 8 ms "meld" time produces useful or exemplar "meld" time score of 16.4% for Function A. As such, the 8 ms "meld" time is selected with the accompanying score of 16.4% and an estimated period of 30 ms.

FIG. 4 shows another non-limiting example implementation of the execution of Function B with an analysis 1200 including different incremental periods of time. Similar to FIG. 3, Function B is analyzed with four example "meld" time intervals of 1 ms, 2 ms, 4 ms, and 8 ms. In the example shown in FIG. 4, the 1 ms time interval 1201 and the 2 ms time interval 1202 are shown where the 1 ms "meld" time interval includes periods 1210-1212. In this example, Function B only produces two "meld" time intervals of importance (1 ms and 2 ms). This is due to "meld" time intervals 4 ms and 8 ms producing the exact same score as the 2 ms time interval, as Function B does not produce any gaps in execution that are greater than or equal to 4 ms and less than or equal to 8 ms. Example calculations for each "meld" time interval for Function B are provided in detail below:

1 ms Meld Time Calculations
- A. Periods=4, 26, 45, 22, 31, 27
- B. Estimated Period (median)=26 ms
- C. Individual Error Diffs from Median=22, 0, 19, 4, 5, 1
- D. Errors divided by Median=22/26, 0/26, 19/26, 4/26, 5/26, 1/26
- E. Total Error Value (sum of squared)=$(22/26)^2+(0/26)^2+(19/26)^2+(4/26)^2+(5/26)^2+(1/26)^2=1.31$
- F. Divide by Count and Take Square Root=Sqrt (1.31/6)=0.467
- G. Score=46.7%

2 ms Meld Time Calculations
- A. Periods=30, 45, 22, 31, 27
- B. Estimated Period (median)=30 ms
- C. Individual Error Diffs from Median=0, 15, 8, 1, 3
- D. Errors divided by Median=0/30, 15/30, 8/30, 1/30, 3/30
- E. Total Error Value (sum of squared)=$(0/30)^2+(15/30)^2+(8/30)^2+(1/30)^2+(3/30)^2=0.33$
- F. Divide by Count and Take Square Root=Sqrt (0.33/5)=0.258
- G. Score=25.8%

4 ms Meld Time Calculations
Same as 2 ms Calculation 8 ms Meld Time Calculations
Same as 2 ms Calculation Thus, the 2 ms "meld" time produces a useful or exemplar "meld" time score of 25.8%. As such, the 2 ms "meld" time is selected with the accompanying score of 25.8% and an estimated period of 30 ms.

FIG. 5 shows another non-limiting example implementation of the execution of Function C with an analysis 1300 including different incremental periods of time. Similar to Functions A and B, Function C is analyzed over the four "meld" time intervals 1 ms 1301, 2 ms 1302, 4 ms 1303, and 8 ms where the 1 ms 1301 interval includes periods 1310 and 1311, the 2 ms interval includes period 1320, and the 4 ms time interval includes periods 1330 and 1331. Much like Function B, Function C only produces three "meld" time intervals of importance (1 ms, 2 ms, and 4 ms). This is due to the 8 ms time interval producing the exact same score as the 4 ms interval, as Function C does not have any gaps in execution that are greater than 4 ms but less than 8 ms. Example calculations for each "meld" time interval for Function C are provided in detail below:

1 ms Meld Time Calculations
- A. Periods=20, 20, 4, 16, 20, 19, 3, 18, 20, 20
- B. Estimated Period (median)=19 ms
- C. Individual Error Diffs from Median=1, 1, 15, 3, 1, 0, 16, 1, 1, 1
- D. Errors divided by Median=1/19, 1/19, 15/19, 3/19, 1/19, 0/19, 16/19, 1/19, 1/19, 1/19
- E. Total Error Value (sum of squared)=$(1/19)^2+(1/19)^2+(15/19)^2+(3/19)^2+(1/19)^2+(0/19)^2+(16/19)^2+(1/19)^2+(1/19)^2+(1/19)^2=1.37$
- F. Divide by Count and Take Square Root=Sqrt (1.37/10)=0.370
- G. Score=37.0%

2 ms Meld Time Calculations
- A. Periods=20, 20, 4, 16, 20, 19, 21, 20, 20
- B. Estimated Period (median)=20 ms
- C. Individual Error from Median=0, 0, 16, 4, 0, 1, 1, 0, 0
- D. Errors divided by Median=0/20, 0/20, 16/20, 4/20, 0/20, 1/20, 1/20, 0/20, 0/20
- E. Total Error Value (sum of squared)=$(0/20)^2+(0/20)^2+(16/20)^2+(4/20)^2+(0/20)^2+(1/20)^2+(1/20)^2+(0/20)^2+(0/20)^2=0.685$
- F. Divide by Count and Take Square Root=Sqrt (0.685/9)=0.276
- G. Score=27.6%

4 ms Meld Time Calculations
- A. Periods=20, 20, 20, 20, 19, 21, 20, 20
- B. Estimated Period (median)=20 ms
- C. Individual Error from Median=0, 0, 0, 0, 1, 1, 0, 0
- D. Errors divided by Median=0/20, 0/20, 0/20, 0/20, 1/20, 1/20, 0/20, 0/20
- E. Total Error Value (sum of squared)=$(0/20)^2+(0/20)^2+(0/20)^2+(0/20)^2+(1/20)^2+(1/20)^2+(0/20)^2+(0/20)^2=0.005$
- F. Divide by Count and Take Square Root=Sqrt (0.005/8)=0.025
- G. Score=2.5%

8 ms Meld Time Calculations
Same as 4 ms Calculation

Thus, in the example shown in FIG. 5, the 4 ms "meld" time produces a useful or exemplar "meld" time score of 2.5%. As such, the 4 ms "meld" time is selected with the accompanying score of 2.5% and an estimated period of 20 ms. It should be appreciated that the analysis is not limited to four meld time periods and can include more or less of any desired duration (not necessarily multiples).

After a useful or exemplar "meld" time is determined for each function, the functions are ranked according to their associated score as shown in FIG. 6. As can be seen in FIG. 6, Functions C, A, and B are ranked in descending order where the associated score, estimated period, and "meld" time are listed with the function. Thus, Function C is ranked first with a score of 2.5%, estimated period of 20 ms, and a 4 ms "meld" time. Function A is ranked second with a score of 16.4%, estimated period of 30 ms, and an 8 ms "meld" time. Function B is ranked third with a score of 25.8%, estimated period of 30 ms, and a 2 ms "meld" time. Upon ranking Functions A-C, the system then groups functions based on their period and score as shown in FIG. 7. Thus, Function C is the lone member of group 1 as it has a 20 ms group period where Functions A and B are in group 2 with a 30 ms group period.

By grouping the functions based on (a) periodicity and (b) score, the system can select a representative or "best" (e.g., most periodic) function for each group period. In this example, Functions A and C are the "best" function for each group period and are selected for displaying the final set of inferred rhythms 1400 as shown in FIGS. 8A-B.

Figure 8A:
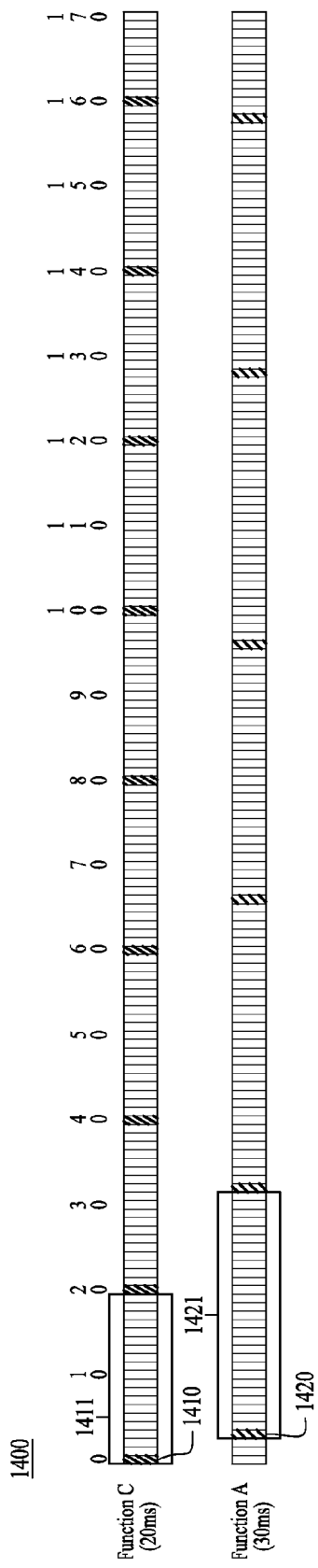
FIGS. 8A-8B are diagrams showing a non-limiting example implementation of a final set of inferred rhythms based on exemplar functions.
Figure 8B:
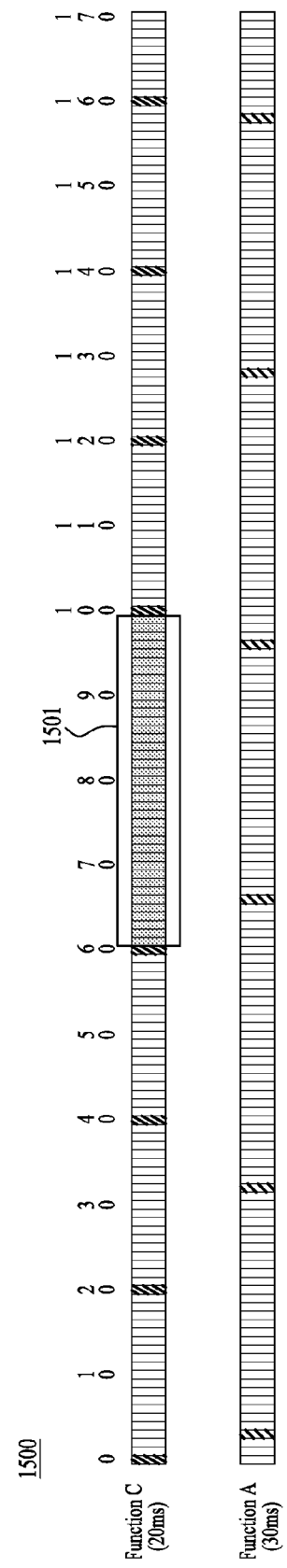

In the example shown in FIG. 8A, Function C (which produced the lowest score for the 20 ms group period) is shown and Function A (which also produced the lowest score for the 30 ms group period) is also shown. Function C begins execution at time 1410 and is not shown as starting again throughout a 20 ms time period 1411 (e.g., corresponding to the 20 ms group period for Function C). Likewise, Function A is shown for the 30 ms group period and begins execution at time 1420 and is not shown as starting again for approximately a 30 ms time period 1421 (e.g., corresponding to the 30 ms group period for Functions A and B).

The visualization in FIG. 8A thus shows a common time over which these functions execute with their own characteristic rhythms. Thus, FIG. 8A advantageously shows a simplified display of function execution when compared to the listing of Functions A-C shown in FIG. 3, for example. While Functions A and C will have moments of execution within their respective periods, the simplified display in FIG. 8A shows the rhythms in which the functions execute without "cluttering" the display with extremely short moments of execution. Additionally, the FIG. 8A visualization is simplified in the example embodiment to show execution start time for each periodic repetition in order to allow a user to better discern the beginning of execution of each of the identified periodic functions.

Thus, the visualization can display final inferred rhythms for a selected function by showing the periodic execution of the function based on start time. That is, and as can be seen in the example shown in FIG. 8A, final inferred rhythms are displayed showing only the time when the function begins executing. This execution is shown over the entire window of time with periodic execution corresponding to the group period for the particular function. Thus, the visualization provides an easily viewable interface for visualizing the periodic rhythm of the more periodic functions in an executing program. It should be appreciated, however, that the present technology is not limited to a graphically displayed visualization but also envisions other methods for indicating rhythms (e.g., audio output from an audio device corresponding to the rhythm of execution with, for example, different functions being represented by different notes or sounds, communication, storage, etc. . . . ).

While the graphical display in FIG. 8A shows functions that execute periodically (or substantially periodically), the graphical display is also capable of showing anomalies or irregularities in program execution. FIG. 8B shows an example of such irregularities.

FIG. 8B shows a similar set of final inferred rhythms 1500 as FIG. 8A, but depicts a situation where Function C has a portion that is not only non-periodic, but irregular when compared to the other execution rhythms of Function C. In the example shown in FIG. 8A, Function C executes at periodic (or substantially periodic) rhythms of 20 ms starting at time t=0 and repeating until time t=160. In FIG. 8B, however, Function C has a gap in its rhythm during the 40 ms time period 1501. That is, Function C executes at periodic (or substantially periodic) rhythms of 20 ms starting at time t=0 and repeating until time t=160 except for the period starting at time t=80. That is, unlike FIG. 8A, the execution of Function C in FIG. 8B shows a case where there is no periodic execution at (or around) time t=80. Thus, FIG. 8B shows an example where function execution can be shown as being periodic (or substantially periodic) while also displaying the irregularities/anomalies in the execution. These irregularities/anomalies can occur for a variety of reasons including, but not limited to, the program being interrupted at that time by input/output processing functionality, the program calling/accessing other functions, etc. The graphical display is also capable of highlighting (or marking) the area of irregularity, as shown in time period 1501 in this example. Of course, the graphical representation is not limited to highlighting and envisions several other forms of notifying a user of the irregular portion of code execution for the particular function.

It should be appreciated that the results shown in FIGS. 8A-B show execution time per frame of a particular function. Thus, the system can perform a frame-by-frame analysis of function execution and can highlight "problem" frames showing irregularities/anomalies in function execution. Thus, not only does the display provide an easy to view interface showing the rhythmic nature of function execution, but also provides an easy to use/view interface for pointing out the irregularities/anomalies in function execution. The system thus provides insight as to the nature of the function execution to those that are both familiar and unfamiliar with the code being executed.

Figure 9:
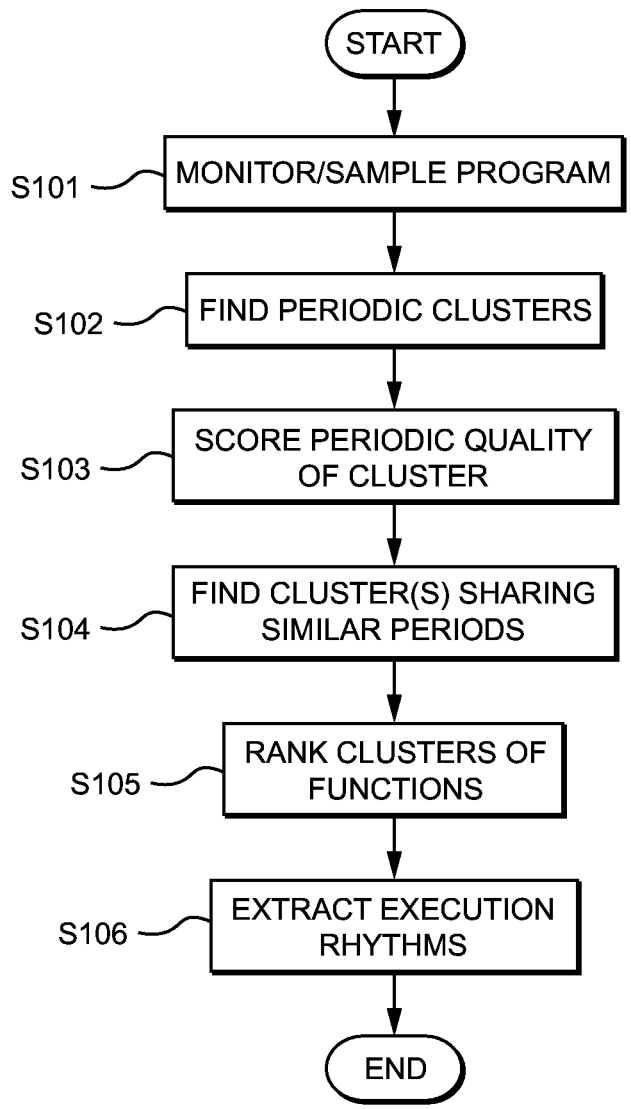
FIG. 9 is a flowchart of a non-limiting example process for detecting and inferring code execution rhythms.
Figure 10A:
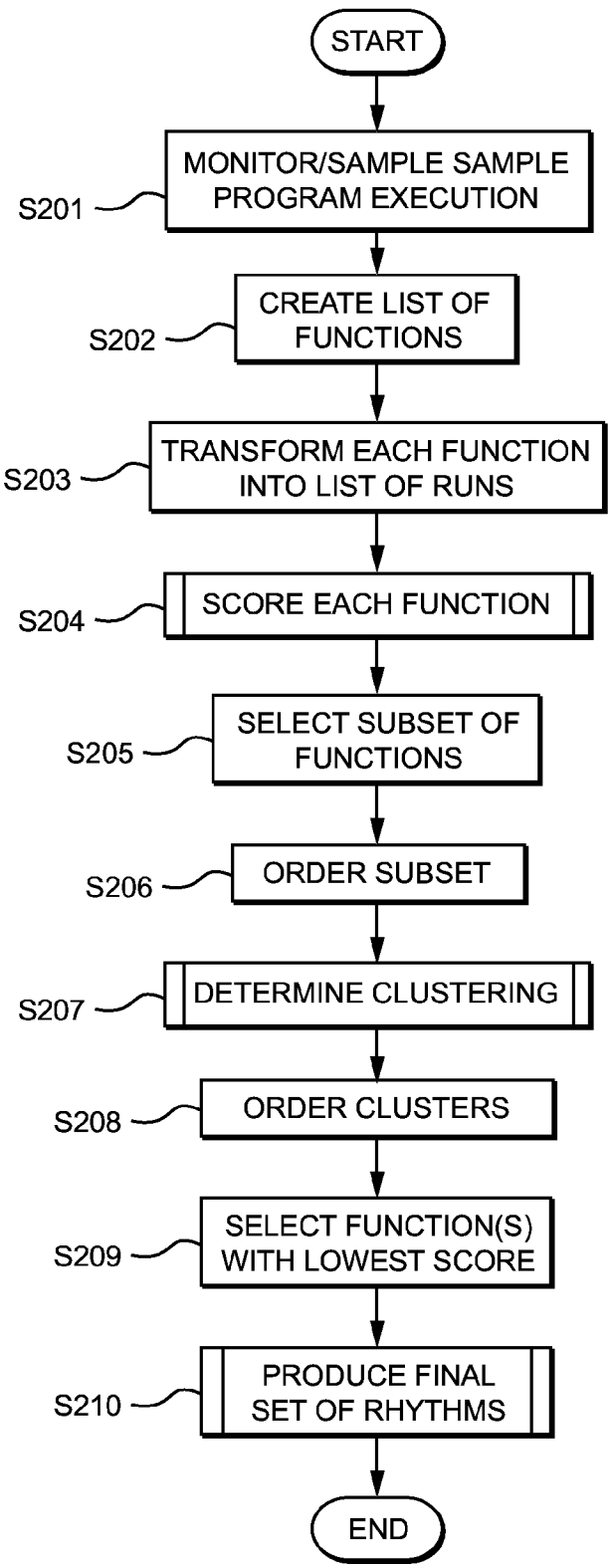
FIGS. 10A-10D are flowcharts of another non-limiting example processes for detecting and inferring code execution rhythms.
Figure 10B:
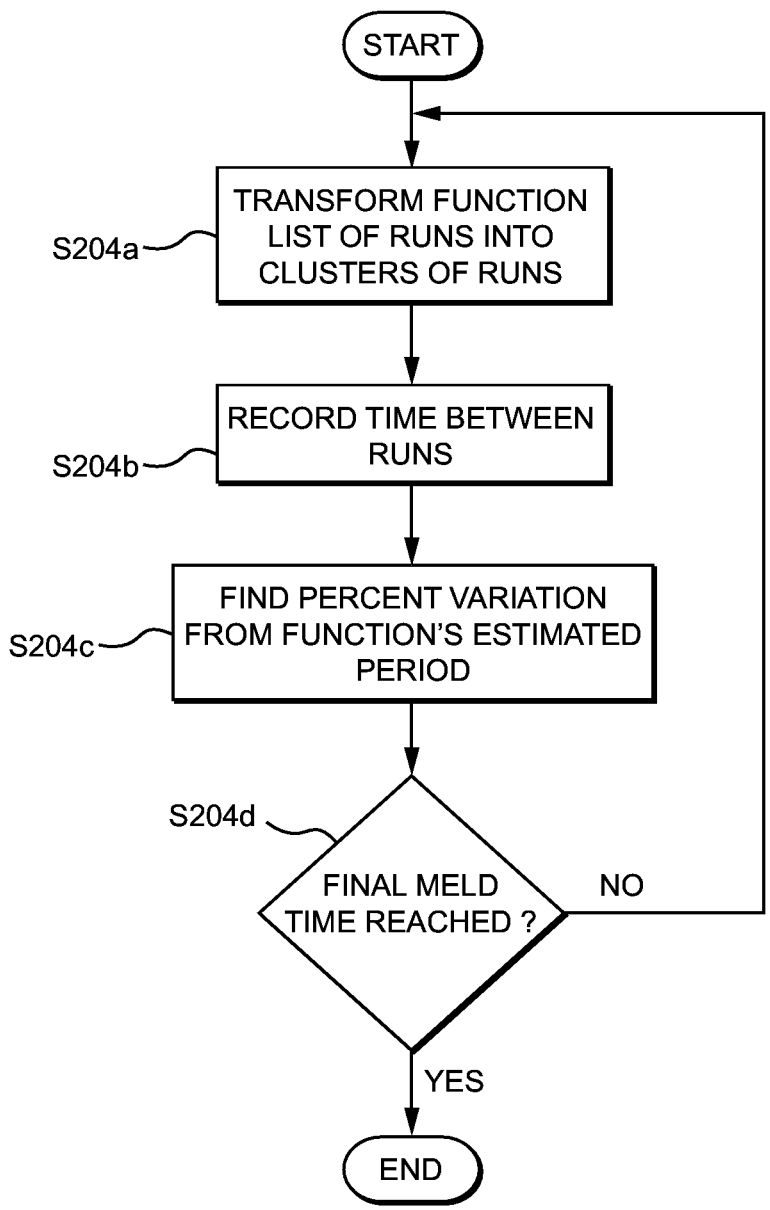
Figure 10C:
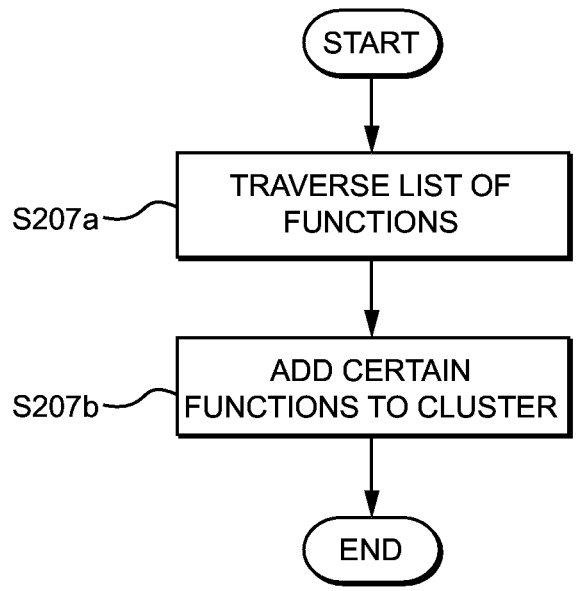
Figure 10D:
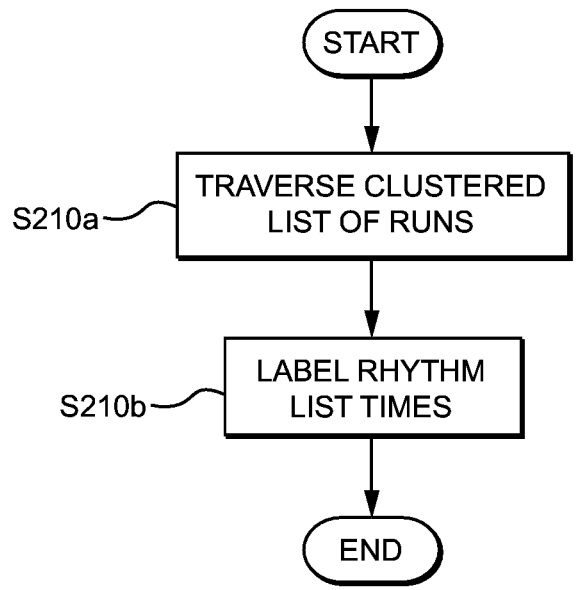

FIG. 9 is a flowchart of a non-limiting example process for detecting and inferring code execution rhythms. The processes described in FIG. 9 can be implemented by the software analysis system 1, for example, and show a basic outline of the processes implemented by the system.

The example process begins by sampling a running software program for function execution times (S101). Although not limited to such sampling techniques, the system can statistically and/or instrumentally sample the running software program. As the program executes various software functions, the system can find periodic clusters of execution times for each function using several different criteria for clustering analysis (S102).

The system can, for each function, score the periodic quality of a given cluster and select the clustering that has the best (e.g., lowest) score (S103). The system can also, for all functions that scored relatively well (e.g., under a threshold), find clusters of functions that share similar periods, using the best scoring functions as cluster seeds (S104).

The system can rank the clusters of functions by how many functions are within each cluster and create an ordered list containing the lowest scoring function from each cluster (S105). The system uses the final list of functions to extract execution rhythms, with each function producing one rhythm based on the start of each execution cluster for that function (S106).

FIGS. 10a-d depict another set of flowcharts of non-limiting example processes for detecting and inferring code execution rhythms. The processes described in FIGS. 10a-d can be implemented by the software analysis system 1, for example, and show a more detailed outline of the processes implemented by the system.

The process begins by sampling (e.g., statistical, instrumenting) the execution of a program running on a target computer hardware platform (S201). Although not limited to this embodiment, the target computer hardware platform can be a game system executing computer software for a video game. The sampling can be accomplished, for example, by periodically stopping the program at regular intervals and recording the callstack of the program along with a timestamp.

Using the data set of recorded callstacks over time, the system can transform the recorded data into a list of code functions with each one containing a list of time/position pairs when it was sampled (S202). For example, a function might have been sampled at time 1 ms and position 5 since this was the $5^{th}$ sample recorded. FIG. 2a shows a graphical representation of this process where Functions A-C are shown with each Function A-C having a list of time/position pairs (e.g., time shown in milliseconds) where the Function A-C was sampled.

The system can further transform each function time/position list into a list of runs, with the start and end times being known for each run (S203). Although not limited to this implementation, a run can be an execution (or running) of a particular function for a given period of time. For example, a function with time/positions of (1 ms, 5), (2 ms, 6), (3 ms, 7) would get transformed into a single run with a start time of 1 ms and an end time of 3 ms. FIG. 2b depicts a diagram showing a non-limiting example implementation of the sampled functions transformed into a list of runs based on the example of the Functions A-C execution as shown in FIG. 2a.

The system can score each function based on the degree that the runs are periodic (S204). FIGS. 3-5 generally depict this overall process and are diagrams depicting non-limiting example implementations of the execution of Functions A-C with an analysis including different incremental periods of time. In particular, FIG. 3 shows Function A with four meld time T calculations for meld times of 1 ms, 2 ms, 4 ms, and 8 ms. FIG. 4 shows Function B with four meld time T calculations for meld times of 1 ms, 2 ms, 4 ms, and 8 ms. FIG. 5 shows Function C with four meld time T calculations for meld times of 1 ms, 2 ms, 4 ms, and 8 ms. It should be appreciated that in one non-limiting example, meld time can mean or refer to an analysis of times as merged for a given time period (e.g., 8 ms). Likewise, FIGS. 3-5 also show the specific calculations for the given meld time T calculations for each of Functions A-C.

In scoring each function (S204), the system first transforms a function's list of runs into clusters of runs by running over the list and combining any two runs that are within a specified meld time T of each other (S204a). For example, a run of (1 ms, 3 ms) and (4 ms, 6 ms) would get combined if meld time T was 1 ms or larger (e.g., the end time of run 1 is within 1 ms of the start time of run 2). As an example, FIG. 3 shows a case for Function A where during a 1 ms meld time T the run of (3 ms, 5 ms) is combined with the run (6 ms, 9 ms) as the end of run (3 ms, 5 ms) is within 1 ms of the start of run (6 ms, 9 ms).

The system can, using the new clustered list of runs, record the time between the start of each run and the start of the subsequent run (S204b) (e.g., from start to start to determine the period). For example, if there are 10 runs, this new list of "times between the starts of runs" will have 9 values (i.e., one less than the number of runs). The list can be ordered from smallest to largest and the middle value will be stored as the "estimated period between runs" (e.g., the median value). In the alternative, the average value can be used from this list as the estimated period between runs (although the data may not be as good for subsequent analysis in some applications).

The system can then process (i.e., run through) the list of "times between the starts of runs" (S204c). For each value, the system can take and calculate the difference from the "estimated period between runs" and divide it by the "estimated period between runs" and call this value the error (e.g., effectively gives an error as a percentage difference from the estimated period, making the error between different functions with differently sized periods comparable). The system may then square the error value and accumulate each one into a total error value. It should be appreciated that squaring the individual errors before summing may penalize functions with larger errors. The system may then divide the total error value by the "number of distances between starts of runs" (to normalize between functions with different numbers of runs) and take the square root of this value (i.e., to return the value to a number relatable to a percentage). The final determined value can be taken to roughly represent the percent variation from the function's estimated period (technically a lower bound), such that smaller values represent functions that are more strictly periodic.

After calculating the percent variation in a function's periodic behavior (S204c), the system may repeat or iterate the steps (S204a-c) with a larger value of meld time T (S204d). As an example, the system can detect rhythms in video games beginning with a meld time T of 125 µs and double the meld time T each iteration with a "cap" at e.g., 16 ms. If a subsequent meld time produces a percent variation that is lower than before, the system may store the lower value and its corresponding meld time, estimated period between runs, and clustered list of runs. The lowest value determined from this process can be considered the "score" with a lower score being preferable, for example.

The system can, from all the scored functions, take the subset of functions that scored at a threshold percentage (e.g., X percentage) or below (S205). The exact value X can be determined based on the type of program running and how irregular the rhythms tend to be. For example, an X of 10% or 15% is good for programs with very regular rhythms and an X of 25% or larger is good for programs with irregular rhythms. From the subset of functions that scored within a percentage X, the system can order them from lowest scoring to highest scoring (S206). FIG. 6 depicts a non-limiting example implementation of a list of executed Functions A-C ordered by score at a threshold percentage X. For example, Function C is ordered first with a score of 2.5% over an estimated period of 20 ms at 4 ms meld time T, where Functions A and B follow with similar estimated periods 30 ms over varying meld times T (8 ms and 2 ms, respectively).

From the subset of functions that scored a threshold percentage X or below, the system can determine a clustering based on periods, using the ordered list as the seed for each cluster (S207). This process can be accomplished by first traversing the list of functions from lowest scoring to highest scoring (S207a) and then, for each function, if the function's estimated period is within a second threshold Y percent (e.g., 20% for video games) of an existing cluster period, then the system can add the function to that cluster (S207b). If the function is not within the second threshold Y percent, then a new cluster is made containing the function. The system will re-evaluate the period of altered clusters by either recalculating the centroid (or mediod) based on functions within the cluster, or the original member of each cluster can be used as the period (which may, in some applications, give better results as it is the most reliable member of the cluster (i.e., it has the lowest score)).

An example of determining the cluster periods is shown in FIG. 7. In particular, FIG. 7 depicts a non-limiting example implementation of a group of Functions A-C that are grouped together based on a period and a score. For example, Function C having the estimated period of 20 ms is designated into Group 1 where Functions A and B having the estimated period of 30 ms are designated into Group 2.

The system can order the clusters from most populated to least populated given the clusters of functions (S208). The ordering of clusters can provide a relative importance of each cluster period with respect to the original running program. With the ordered cluster periods, the system will traverse each cluster and select the function with the lowest score and add it to a final list of ideal/exemplar functions from which the rhythms will be extracted (S209).

The system can take each exemplar function and, using the clustered list of runs based on the meld time T that produced a lowest score, produce a final set of rhythms consisting of a list of times (S210). In producing the final set of rhythms (S210), the system will traverse the clustered list of runs and add the start time of each run to the rhythm list of times (S210a). The system can label the rhythm list of times with the estimated period of the exemplar function (S210b). For example, if the exemplar function's estimated period was 3 ms, the rhythm list of times is representative of a "3 ms rhythm" with exact occurrence times contained in the list.

The resulting ordered list of rhythms is representative of the exact rhythms recorded during execution of the program and an example of such is shown in FIGS. 8A-B. In particular, FIGS. 8A-B show a set of final inferred rhythms based on exemplar Functions A-C. For example, the 20 ms rhythm is based on the patterns of execution of Function C where the 30 ms rhythm is based on the patterns of execution of Function A.

It should be appreciated that the rhythm times are usually not absolutely periodic and instead can represent roughly the periodic nature of executing the program. For example, FIG. 8B shows an instance where the execution of Function C may have periods that are not absolutely periodic and even irregular in certain portions. This information can then be used by itself or in conjunction with a code profile to further understand and analyze the execution of the program.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A method implemented using an information processing apparatus for identifying code execution rhythms by monitoring function execution behavior in a running program, comprising:
 monitoring, using a processor, functions executing in a running program over a period of time to identify rhythmic execution patterns in the running program;
 analyzing the functions to find clusters of function execution;
 grouping the clusters with respect to time thresholds;
 evaluating the grouped clusters to determine a periodicity of the identified rhythmic execution patterns;
 generating a displayable visualization having a time axis displayed along a first axis, an ordered listing of the selected functions in the set displayed along a second axis, and a graphical depiction of execution start times for each function in the ordered listing displayed adjacent to the respective function along the second axis; and
 determining execution time per frame for each function in the ordered listing thereby allowing frame-by-frame analysis of function execution.

2. The method of claim 1, wherein selecting comprises determining whether the analyzed functions are periodic or substantially periodic.

3. The method of claim 1, wherein the displayable visualization is further configured to highlight irregularities in function execution for each function in the ordered listing.

4. A method implemented in an information processing apparatus having one or more processors and for identifying code execution rhythms, comprising:
 monitoring, using the one or more processors, functions executing in a running program over a period of time to identify rhythmic execution patterns;
 evaluating the periodicity of the identified rhythmic execution patterns; and
 generating a displayable visualization having a time axis displayed along a first axis, an ordered listing of selected functions displayed along a second axis, and a graphical depiction of execution start times for each function in the ordered listing displayed adjacent to the respective function along the second axis.

5. The method of claim 4, wherein said visualization shows non-repetitive characteristics and irregularities of said identified patterns.

6. The method of claim 4, wherein
 the monitoring further comprises monitoring the one or more functions executing in the running program to identify periodic behavior of the one or more functions, and
 the evaluating further comprises selecting at least one function, from the one or more monitored functions, based on a period and a score associated with the periodic behavior.

7. The method of claim 4, wherein the display is further configured to mark irregularities in function execution for each of the one or more functions in the ordered listing.

8. The method of claim 4, further comprising:
 identifying clusters of execution for each of the monitored one or more functions;
 merging the identified clusters of execution with respect to one or more time thresholds; and
 selecting a time threshold for each of the monitored functions having a period and a score associated with the time threshold.

9. A non-transitory computer-readable storage storing instructions which, when executed by one or more processors of an information processing apparatus, cause the information processing apparatus to provide execution comprising:
 monitor functions executing in a running program over a period of time to identify rhythmic execution patterns;
 evaluate the periodicity of the identified rhythmic execution patterns; and
 generate a displayable visualization having a time axis displayed along a first axis, an ordered listing of selected functions displayed along a second axis, and a graphical depiction of execution start times for each function in the ordered listing displayed adjacent to the respective function along the second axis.

10. The non-transitory computer-readable storage of claim 9, wherein said visualization shows non-repetitive characteristics and irregularities of said identified patterns.

11. The non-transitory computer-readable storage of claim 9, wherein
 the monitoring further comprises monitoring the one or more functions executing in the running program to identify periodic behavior of the one or more functions, and
 the evaluating further comprises selecting at least one function, from the one or more monitored functions, based on a period and a score associated with the periodic behavior.

12. The non-transitory computer-readable storage of claim 9, wherein the display is further configured to highlight irregularities in function execution for each of the one or more functions in the ordered listing.

13. The non-transitory computer-readable storage of claim 9, wherein the information processing apparatus is further caused to provide execution comprising:
 identify clusters of execution for each of the monitored one or more functions;
 merge the identified clusters of execution with respect to one or more time thresholds; and
 select a time threshold for each of the monitored functions having a period and a score associated with the time threshold.

14. A system for identifying code execution rhythms, comprising:
 a memory; and
 at least one processor operatively coupled to the memory and configured to:
  monitor functions executing in a running program over a period of time to identify rhythmic execution patterns,
  select identified rhythmic execution patterns based on periodicity, and
  generate a displayable visualization having a time axis displayed along a first axis, an ordered listing of selected functions displayed along a second axis, and a graphical depiction of execution start times for each function in the ordered listing displayed adjacent to the respective function along the second axis.

15. The system of claim 14, wherein generating the displayable visualization further comprises:
- generating a graphical representation of a grid along a first axis including one or more segments representing single intervals of time and extending along the first axis for a duration of time; and
- generating a graphical representation of the identified rhythmic execution in the grid by highlighting segments throughout the one or more segments representing single intervals of time.

16. The system of claim 15, wherein the at least one processor is further configured to highlight portions of the graphical representation of the grid representing irregularities in the periodicity of the execution patterns.

* * * * *